United States Patent
Fleury et al.

(10) Patent No.: US 7,430,413 B2
(45) Date of Patent: Sep. 30, 2008

(54) METHOD AND DEVICE FOR SIMULATING A RADIO CHANNEL

(75) Inventors: Bernard Fleury, Aalborg (DK); Alexander Kocian, Aalborg (DK)

(73) Assignee: Elektrobit System Test Oy, Oulunsalo (FI)

( * ) Notice: Subject to any disclaimer, the term of this patent is extended or adjusted under 35 U.S.C. 154(b) by 1116 days.

(21) Appl. No.: 10/494,239

(22) PCT Filed: Nov. 7, 2002

(86) PCT No.: PCT/FI02/00869

§ 371 (c)(1),
(2), (4) Date: May 3, 2004

(87) PCT Pub. No.: WO03/041308

PCT Pub. Date: May 15, 2003

(65) Prior Publication Data

US 2004/0253950 A1 Dec. 16, 2004

(30) Foreign Application Priority Data

Nov. 9, 2001 (FI) .................................. 20012178

(51) Int. Cl.
*H04Q 7/20* (2006.01)

(52) U.S. Cl. .................. 455/423; 455/67.11; 455/67.14; 455/67.16; 455/115.1; 342/169; 342/172

(58) Field of Classification Search .............. 455/422.1, 455/423, 67.11, 67.14, 67.16, 115.1, 115.2, 455/226.1, 242.1, 242.2, 243.1; 342/169, 342/171, 172

See application file for complete search history.

(56) References Cited

U.S. PATENT DOCUMENTS 5,973,638 A   10/1999   Robbins et al.
6,185,266 B1  2/2001    Kuchi et al.

(Continued)

FOREIGN PATENT DOCUMENTS

WO   WO 01/17301 A1   3/2001

OTHER PUBLICATIONS

K.I. Pedersen et al., "A Stochastic Multiple-Input-Multiple-Output Radio Channel Model for Evaluation of Space-Time Coding Algorithms", *IEEE Electronic Letters*, vol. 2, Accession No. 6880023, pp. 893-897 (2000).

(Continued)

*Primary Examiner*—Matthew Anderson
*Assistant Examiner*—Dominic E Rego
(74) *Attorney, Agent, or Firm*—Hoffmann & Baron, LLP

(57) ABSTRACT

The invention relates to a device and a method for simulating a radio channel, wherein a signal transmitted and received by more than one antenna is simulated. The method comprises supplying an input signal of each antenna to a similar delay line, each delay line comprising a delay element connected in series for each propagation path, weighting an output signal of the delay elements corresponding with each propagation path by a term in dependence of a control vector of each transmitting antenna, by a term describing the distortion of a propagation path, and by a term in dependence of a control vector of each receiving antenna, and adding up the components corresponding with each receiving antenna and obtained from the outputs of the weighting means.

10 Claims, 4 Drawing Sheets

U.S. PATENT DOCUMENTS 6,285,972 B1 * 9/2001 Barber .......................... 703/8
2006/0291581 A1 * 12/2006 Onggosanusi et al. ....... 375/267

OTHER PUBLICATIONS

M. Stege et al., "A Multiple Input—Multiple Output Channel Model for Simulation of Tx- and Rx-Diversity Wireless Systems", *IEEE Electronic Letters*, vol. 2, Accession No. 6880016, pp. 833-839 (2000).

Ruly Lau-U Choi et al., "MIMO CDMA Antenna Systems", *IEEE Electronic Letters*, vol. 2, Accession No. 6715709, pp. 990-994 (2000).

* cited by examiner

Fig. 5A
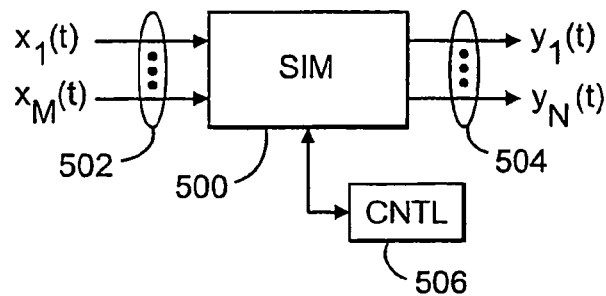
Fig. 5B
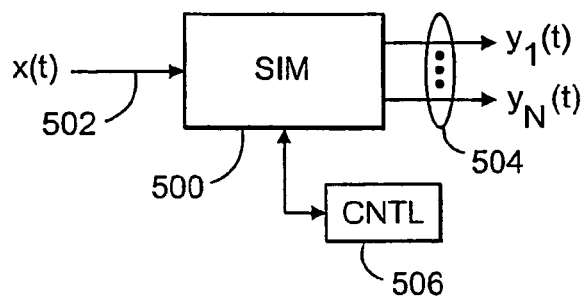
Fig. 5C
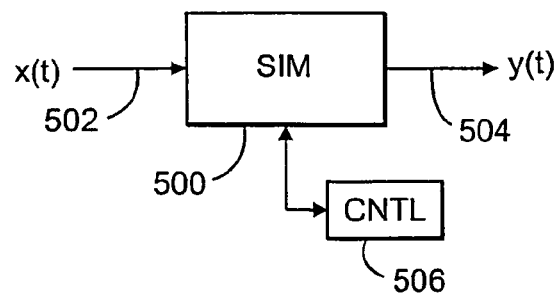
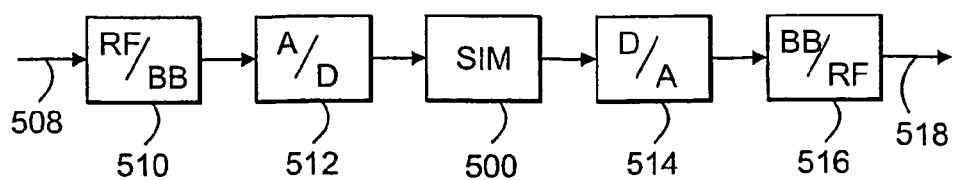
Fig. 5D

METHOD AND DEVICE FOR SIMULATING A RADIO CHANNEL

CROSS-REFERENCE TO RELATED APPLICATION

This application is a National Phase application of International Application No. PCT/FI02/00869 filed Nov. 7, 2002, which is incorporated herein by reference.

FIELD OF THE INVENTION

The invention relates to a method and a device implementing the method for simulating a radio channel. The invention particularly relates to a situation wherein several antennas are used in transmitting and/or receiving a signal propagating through a radio channel.

BRIEF DESCRIPTION OF THE RELATED ART

An essential problem with radio systems is the fast variation of radio channel properties as a function of time. This relates to mobile telephone systems in particular wherein at least one of the parties to a connection is often a mobile one. The attenuation and impulse response of a radio channel then vary within a large phase and amplitude area even thousands of times per second. The phenomenon is random in nature, so mathematically it can be described statistically. The phenomenon makes radio connections and devices to be used more difficult to design.

Several reasons exist for radio channel variation. When a radio-frequency signal is transmitted from a transmitter to a receiver in a radio channel, the signal propagates via one or more paths, the phase and amplitude of the signal varying on each propagation path. Phase variation in particular causes fades of different duration and strength to the signal. Noise and interference caused by other transmitters also interfere with a radio connection.

A radio channel can be tested either under real conditions or by using a simulator simulating real conditions. Tests conducted under real conditions are difficult since tests conducted e.g. outdoors are affected e.g. by the weather and the seasons, which change all the time. Measurements conducted even at the same location give different results at different times. Furthermore, a test conducted in one environment (city A) does not completely apply to a similar environment (city B). The worst possible situation cannot often be tested under real conditions, either.

A device simulating a radio channel, on the other hand, can be used for quite freely simulating a radio channel having desired features between two radio devices such that the radio devices operate at their natural transmission rates, as in a real operating situation.

Typically between a transmitter and a receiver, several propagation paths exist via which a signal propagates and, furthermore, if several transmitting and/or receiving antennas are used, the situation becomes substantially heavier to simulate. Assume, for instance, an arrangement which includes M transmitting antennas, a radio channel and N receiving antennas. In such a case, the channel is a Multiple Input Multiple Output (MIMO) radio channel, which is described by an N×M transfer matrix. Each (n,m) element in the matrix is a time-varying impulse response for a sequence comprising the $m^{th}$ transmitting antenna, the $n^{th}$ receiving antenna and the radio channel.

In prior art solutions, in order to simulate the shown situation, each matrix element is simulated by a time-varying, transversal filter, typically by an FIR filter. The total number of FIR filters needed is thus M×N. An arrangement is further needed to describe the correlation between the different elements of the matrix. If it is assumed that the number of different propagation paths of the signals is K, the complexity of the implementation of the prior art calculation method, expressed as the necessary multiplications, delay elements and additions, is M×N×K delays, M×N×K multiplications and M×N×K additions. It is to be noted that the complexity of a K input adder is K. The effect of the calculation of the correlation between the elements of the transfer matrix has not been taken into account herein.

When the number of transmitting and receiving antennas increases, the complexity required by the calculation increases dramatically. The simulation of MIMO systems has thus required an extremely heavy calculation capacity. This is a difficult problem since due to their potential advantages, this type of systems have become increasingly attractive.

SUMMARY OF THE INVENTION

An object of the invention is to provide a method and an apparatus implementing the method such that simulation of a MIMO radio channel becomes easy to implement. This is achieved by a method for simulating a radio channel, wherein a signal transmitted by more than one antenna and received by one or more antennas as well as propagated via one or more propagation paths is simulated. The method of the invention comprises supplying an input signal of each transmitting antenna to a similar delay line, each delay line comprising a delay element connected in series for each propagation path, weighting, in weighting means, an output signal of the delay elements corresponding with each propagation path by a term in dependence of a control vector of each transmitting antenna, by a term describing the distortion of a propagation path, and by a term in dependence of a control vector of each receiving antenna, a signal component thus being provided for each receiving antenna, and adding up the components corresponding with each receiving antenna and obtained from the outputs of the weighting means.

The invention also relates to a device for simulating a radio channel, wherein a signal transmitted by more (M) than one antenna and received by one or more antennas (N) as well as propagated via one or more propagation paths is simulated. The device of the invention comprises M similar delay lines, each delay line comprising a delay element connected in series for each propagation path, the input of the delay lines comprising M signals to be transmitted, a number of weighting means whose input comprises output signals of the delay elements corresponding with each propagation path, the output signals being weighted by a term describing the distortion of a corresponding propagation path, by a term in dependence of a control vector of each transmitting antenna and by a term in dependence of a control vector of each receiving antenna, the terms being located in other inputs, and whose output comprises a signal for each receiving antenna, and an adder configured to add up the terms corresponding with each receiving antenna and obtained from the outputs of the weighting means.

A solution of the invention may be implemented both as a hardware- and a software-based implementation. A simulator according to the preferred embodiments is implemented by means of delay lines, weighting means and an adder. The number of delay lines is preferably the same as the number of transmitting antennas. The elements of the delay lines correspond with the numbers of propagation paths. Signals propagated through each propagation path are weighted by a term describing the distortion of the propagation path and terms in dependence of the control vectors of the transmitting and receiving antennas. Finally, the terms corresponding with each receiving antenna are added up.

The method and device of the invention provide several advantages. The solution disclosed enables the amount of calculation needed in the simulation of a radio channel to be reduced substantially. The calculation of the correlation between different transfer matrix elements also becomes smoothly taken into account during the calculation. If it is assumed that the number of transmitting antennas is M, the number of receiving antennas is N and the number of different propagation paths of the signals is K, the complexity in the solutions according to the preferred embodiments is M×K delays, (M+N+1)×K multiplications and (N+1)×K additions. Compared to the previous solutions, the complexity reduction factor is thus at least N for delays, (M×N)/(M+N+1) for the number of multiplications and (M×N)/(N+1) for the number of additions. Consequently, the simulating apparatus of the disclosed solution is substantially more advantageous and easier to implement than the previous solutions that have required a heavier calculation capacity.

BRIEF DESCRIPTION OF THE DRAWINGS

The invention is now described in closer detail in connection with the preferred embodiments and with reference to the accompanying drawings, in which FIGS. 5A to 5D illustrate examples of implementation of a simulating apparatus.

DETAILED DESCRIPTION OF THE PREFERRED EMBODIMENTS

Figure 1A:
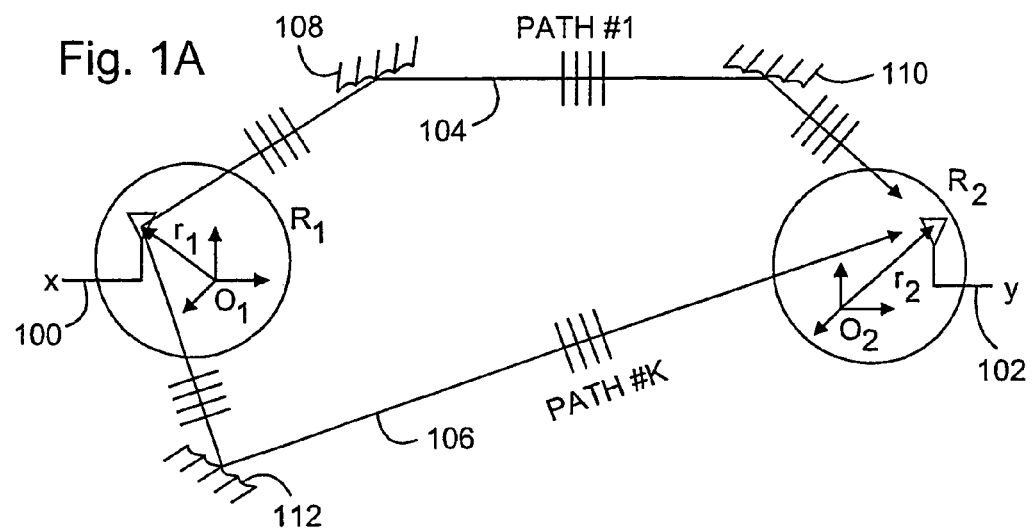
FIG. 1A illustrates a signal propagation environment typical of radio systems, FIG. 1B clarifies the designations used.

First, let us define some terms. Examine an example according to FIG. 1A of a signal propagation environment typical of radio systems. The figure shows a transmitting antenna 100 and a receiving antenna 102, and a number of propagation paths 104, 106 for signal waves therebetween. Let the number of propagation paths be K. A wave encounters a number of obstructions on a propagation path. Upon encountering an obstruction, the wave may e.g. be reflected, or it may scatter or spread. In each encounter, the amplitude of the wave is attenuated and its phase changes, depending on the characteristics of the obstacle and the input and output angles of the wave.

Figure 1B:
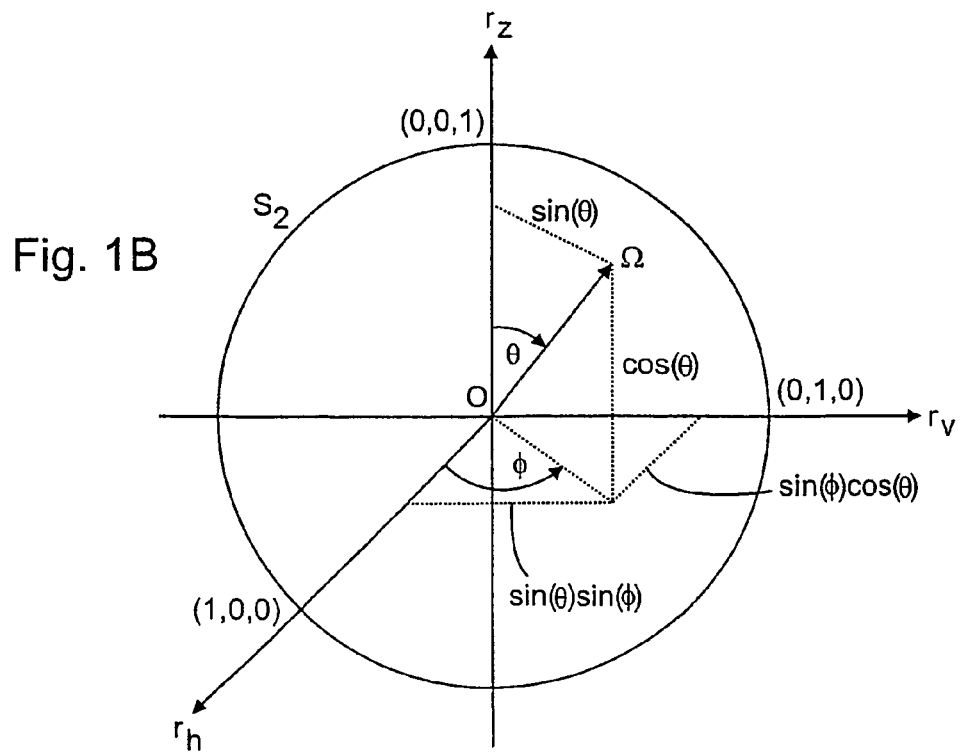

When the transmitting antenna 100 is moved slightly, typically for some multiples of the wavelength of a signal to be transmitted, the geometry of the propagation path of the signal waves remains substantially the same. An area within which the transmitting antenna can be moved without the geometry of the propagation path changing is shown by $R_1$ in FIG. 1. Similarly, $R_2$ designates an area within which the receiving antenna 102 can be moved without the geometry of the propagation path of the signal waves substantially changing. Let us use a coordinate system wherein origins $O_1$ and $O_2$, correspondingly, have been determined to a random point within area $R_1$ and area $R_2$, respectively. The locations of the antennas 100 and 102 thus completely determine vectors $r_1 \in R^3$ and $r_2 \in R^3$, wherein R is a real axis.

Let $x \in C$ (wherein C is a complex space) a complex envelope signal in the input of a transmitting antenna when the antenna is located at $r_1 \in R_1$. Now, the component caused by the $k^{th}$ wave in the output of a receiving antenna located at $r_2 \in R_2$ can be described by the formula:

$$y_k(r_1,r_2) = \alpha_k \exp\{j2\pi\lambda_0^{-1}(\Omega_{1k} \cdot r_1)\} \exp\{j2\pi\lambda_0^{-1}(\Omega_{2k} \cdot r_2)\}x.$$

Here $\lambda_0$ is the wavelength of the signal and ($\cdot$) refers to a scalar product. Furthermore, $\alpha_k$ is a complex attenuation coefficient of the $k^{th}$ wave, and $\Omega_{1k}$ as well as $\Omega_{2k}$ refer to the output and input angles of the wave with respect to the transmitting and receiving antennas. The designations of the formula will be clarified in FIG. 1B which shows origin $O_1$ while $r_h$, $r_v$ and $r_z$ designate axes. The figure shows circle $S_2$ whose radius is one and wherein point $\Omega$ is located. The direction of the wave can be determined as a unit vector terminating at point $\Omega$. Point $\Omega$ is unambiguously determined by its spherical coordinates $(\phi, \theta) \in [-\pi, \pi) \times [-\pi, \pi]$ according to the following relation:

$$\Omega = e(\phi, \theta) \doteq [\cos(\phi)\sin(\theta), \sin(\phi)\sin(\theta), \cos(\theta)]^T.$$

Here $(\ )^T$ is a transposition operation. Angles $\phi$ and $\theta$ are called the azimuth angle and the coelevation angle of $\Omega$. The complex attenuation coefficient $\alpha_k$ depends on the interactions between the $k^{th}$ wave and the obstructions on the propagation path, the length of the propagation path of the wave as well as on the characteristics of the field patterns of the transmitting and receiving antennas in directions $\Omega_{1k}$ and $\Omega_{2k}$.

Figure 2:
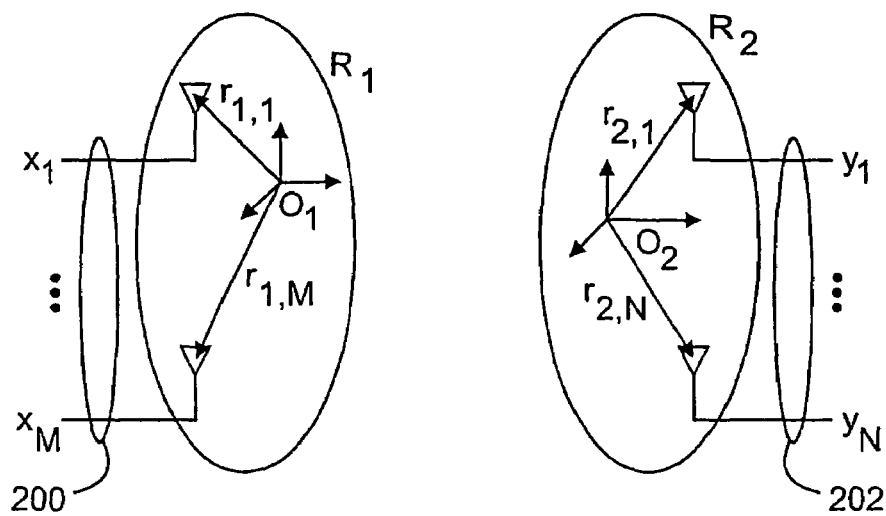
FIG. 2 shows an example wherein a radio channel is static.

Next, let us examine the situation shown in FIG. 2 wherein M transmitting antennas 200 and N receiving antennas 202 are positioned in areas $R_1$ and $R_2$. If $x_m$ describes the signal in the input of the $m^{th}$ transmitting antenna located at $r_{1,m} \in R_1$, $m=1, \ldots, M$, an output signal of the $n^{th}$ receiving antenna at $r_{2,n} \in R_2$ can be described by the formula $$y_n = \sum_{m=1}^{M} H(r_{1,m}, r_{2,n})x_m, \quad n = 1, \ldots, N.$$

The above N linear equations can be described in a matrix form in the following manner:

$$\begin{bmatrix} y_1 \\ \vdots \\ y_N \end{bmatrix} = \begin{bmatrix} H_{1,1} & \ldots & H_{1,M} \\ \vdots & & \vdots \\ H_{N,1} & \ldots & H_{N,M} \end{bmatrix} \begin{bmatrix} x_1 \\ \vdots \\ x_M \end{bmatrix} \quad (1)$$

wherein designation $H_{n,m} \doteq H(r_{1,m}, r_{2,n})$ is used.

When the locations of the transmitting and receiving antennas are taken into account, the above designation can be expressed in the form $$H_{n,m} = \int\int \exp\{j2\pi\lambda_0^{-1}(\Omega_1 \cdot r_{1,m})\} \exp\{j2\pi\lambda_0^{-1}(\Omega_2 \cdot r_{2,n})\} h(\Omega_1, \Omega_2) d\Omega_1 d\Omega_2. \quad (2)$$

Here, the term $h(\Omega_1, \Omega_2)$ can be called a bidirectional input angle spread function. In this case, it is a discrete function of the form $$h(\Omega_1, \Omega_2) = \sum_{k=1}^{K} \alpha_k \delta(\Omega_1 - \Omega_{1k}) \delta(\Omega_2 - \Omega_{2k}) \quad (3)$$

It describes spreading in the propagation direction of the signal jointly within areas $R_1$ and $R_2$. In a general case, it does not have to be a discrete function but if it is of the form of Formula (3), the portion of one wave in $h(\Omega_1,\Omega_2)$ is a Dirac impulse weighted by $\alpha_k$ and localised to point $(\Omega_{1k},\Omega_{2k})$ in space $S_2 \times S_2 \doteq (S_2)^2$.

Equation (1) can be expressed in a compact form as $$y = Hx, \quad (4)$$

wherein x on M dimensional complex value vector $x \doteq [x_1, \ldots, x_M]^T$, y is N dimensional complex value vector $y \doteq [y_1, \ldots, y_M]^T$, and H is N×M dimensional complex value matrix $H \doteq [H_{n,m}]_{n \in \{1, \ldots, N\}, m \in \{1, \ldots, M\}}$.

Formula (4) thus determines the input and output relation for a MIMO channel comprising M transmitting antennas, a radio wave propagation path and N receiving antennas. Matrix H is called the transfer matrix of the channel. Its coefficients depend on the structure of the antenna arrays used in transmission and reception as well as on the conditions of the radio channel.

Examine the structure of matrix H in closer detail, particularly focusing on the exponent terms of Formula (2). The M and N dimensional vectors $$c_1(\Omega_1) \doteq [\exp\{j2\pi\lambda_0^{-1}(\Omega_1 \cdot r_{1,1})\}, \ldots, \exp\{j2\pi\lambda_0^{-1}(\Omega_1 \cdot r_{1,M})\}]^T \quad (5)$$

$$c_2(\Omega_2) \doteq [\exp\{j2\pi\lambda_0^{-1}(\Omega_2 \cdot r_{2,1})\}, \ldots, \exp\{j2\pi\lambda_0^{-1}(\Omega_2 \cdot r_{2,N})\}]^T \quad (6)$$

present a response of two antenna arrays to a wave being received/transmitted at a certain angle $\Omega_1$ and $\Omega_2$ with respect to the antenna arrays. These vectors can be called antenna control vectors. They describe how signals received by different antenna elements differ from each other, e.g. for the phase. Using these vectors, Formula (2) can be expressed in the form $$H_{n,m} = \iint [c_1(\Omega_1)]_m [c_2(\Omega_2)]_n h(\Omega_1,\Omega_2) d\Omega_1 d\Omega_2. \quad (7)$$

The transfer matrix thus being of the form $$H = \iint c_2(\Omega_2) c_1(\Omega_1)^T h(\Omega_1,\Omega_2) d\Omega_1 d\Omega_2. \quad (8)$$

In a discrete case, wherein the bidirectional input angle spread function is of form (3), Formula (8) is reduced to a sum $$H = \sum_{k=1}^{K} \alpha_k c_{2,k} c_{1,k}^T \quad (9)$$

wherein $$c_{1,k} \doteq c_1(\Omega_{1k}) [\exp\{j2\pi\lambda_0^{-1}(\Omega_{1k} \cdot r_{1,1})\}, \ldots, \exp\{j2\pi\lambda_0^{-1}(\Omega_{1k} \cdot r_{1,M})\}]^T.$$

$$c_{2,k} \doteq c_2(\Omega_{2k}) [\exp\{j2\pi\lambda_0^{-1}(\Omega_{2k} \cdot r_{2,1})\}, \ldots, \exp\{j2\pi\lambda^{0-1}(\Omega_{2k} \cdot r_{2,N})\}]^T.$$

In the discrete case, the effect of one wave on the transfer matrix is thus a unit rank matrix. As the received signal, Formulas (2) and (9) now give $$y = \sum_{k=1}^{K} \alpha_k c_{2,k} c_{1,k}^T x. \quad (10)$$

and for one sum term $y_k$, $$y_k \doteq c_{2,k} \alpha_k c_{1,k}^T x \quad (11)$$

is thus valid.

Figure 3A:
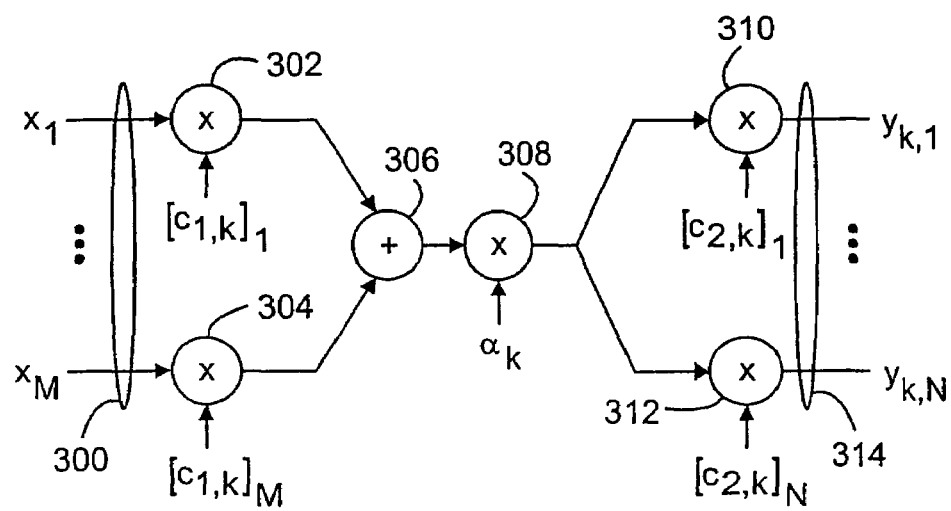
FIGS. 3A and 3B illustrate examples of implementation of a calculation element.
Figure 3B:
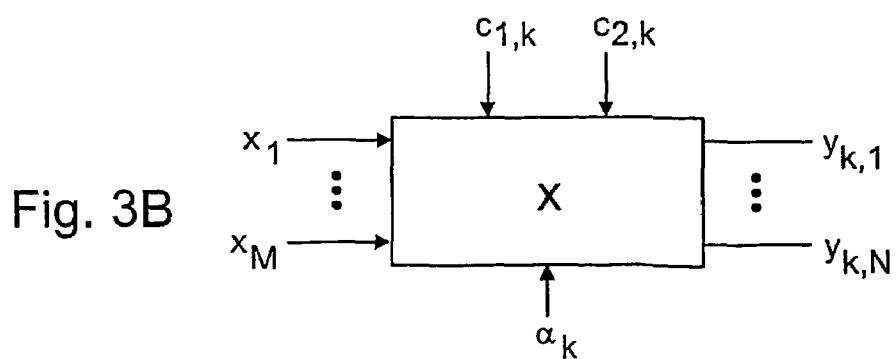

FIGS. 3A and 3B illustrate the implementation of this calculation in a simulating apparatus in accordance with the preferred embodiments. In FIG. 3A, an input comprises signal components 300 $x_m$, m=1, . . . ,M transmitted from each antenna. Each of these is supplied to a multiplier 302, 304, in which the signal components are multiplied by element $[c_{1,k}]_m$ of a control vector of each transmitting antenna. These components multiplied by the control vector are added up in an adder 306, and the sum signal obtained is multiplied in a multiplier 308 by complex attenuation coefficient $\alpha_k$. The sum signal thus obtained is supplied to a number N of multipliers 310, 312, wherein N is thus the number of receiving antennas. In the multipliers 310, 312, each signal component is multiplied by element $[c_{2,k}]_n$ of a control vector of a corresponding receiving antenna. Output signals $y_{k,n}$ of the receiving antennas are obtained from an output 314 of the multipliers. FIG. 3B illustrates an equivalent implementation of the solution. The solution may be implemented either by software or hardware. The signal components 300 transmitted from each antenna, antenna control vectors $c_{1,k}$ and $c_{2,k}$, and complex attenuation coefficient $\alpha_k$ are needed as inputs while the output signals $y_k$ 314 of the receiving antennas are needed as an output. The structure described herein enables particularly the correlations between the different elements of the transfer matrix to be taken into account for each wave.

Figure 4:
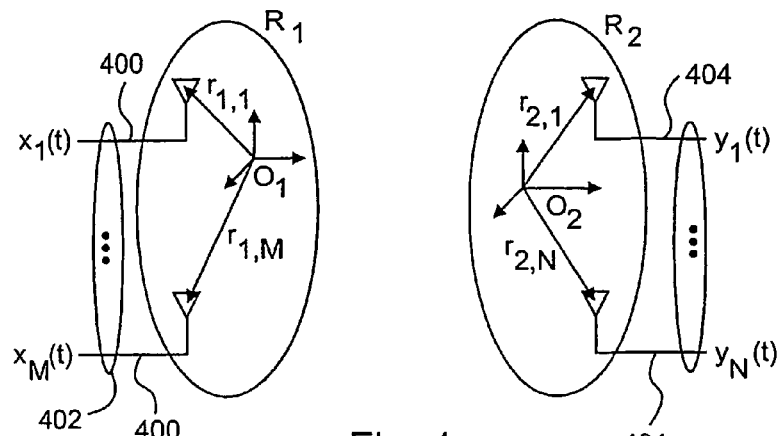
FIG. 4 shows an example wherein a radio channel varies according to time and frequency.

A situation has been examined above wherein no channel variation with respect to time and frequency has been taken into account. FIG. 4 illustrates a situation wherein a radio channel varies according to time and frequency. Time variation is caused e.g. by a movement of an antenna or a reflective surface. Such a situation is modeled herein by assuming that a propagated wave has a certain constant Doppler frequency. Let us designate the Doppler frequency of wave k by term $v_k$. Frequency variation is caused by alteration in the lengths of the propagation paths of waves. Let us designate the proportional delay of wave k by term $\tau_k$.

Here, too, let us use a coordinate system wherein origins $O_1$ and $O_2$, correspondingly, have been determined to a random point within area $R_1$ and area $R_2$, respectively. The figure shows M transmitting antennas 400, whose input comprises a signal x(t) 402, as a function of time, to be transmitted. Vectors $r_{1,1}, \ldots, r_{1,M}$ describe the location of the antennas with respect to the arbitrarily selected origin $O_1$. Correspondingly, the location of N receiving antennas 404 with respect to origin $O_2$ is described by vectors $r_{2,1}, \ldots, r_{2,N}$.

Now, the signal component $y_{nm}(t)$ generated by $x_m(t)$ and located in the output of the $n^{th}$ receiving antenna is $$y_{nm}(t) = \int h(r_{1,m}, r_{2,n}, t; \tau) x_m(t - \tau) d\tau$$

$$= \int h_{n,m}(t; \tau) x_m(t - \tau) d\tau$$

wherein $$h_{n,m}(t;\tau) \doteq h(r_{1,m}, r_{2,n}, t; \tau). \tag{12}$$

The signal in the output of the $n^{th}$ receiving antenna is $$y_n(t) = \sum_{m=1}^{M} y_{nm}(t)$$

$$= \sum_{m=1}^{M} \int h_{n,m}(t;\tau) x_m(t-\tau) d\tau, \, n = 1, \ldots, N.$$

Arranging n above equations in a matrix form yields the following formula $$y(t) = \int h(t;\tau) \times (t-\tau) d\tau, \tag{13}$$

wherein $$x(t) \doteq [x_1(t), \ldots, x_M(t)]^T$$

$$y(t) \doteq [y_1(t), \ldots, y_N(t)]^T$$

$$h(t;\tau) \doteq [h_{n,m}(t;\tau)]_{n \in \{1,\ldots,N\}, m \in \{1,\ldots,M\}}. \tag{14}$$

The term $h(t;\tau)$ can be called a time-depending broadband transfer matrix or a time-depending impulse response in a MIMO radio channel.

A time-depending channel matrix can be described in closer detail if Formulas (5) and (6) are taken into account. Utilizing the two formulas, Formula (14) can be written as follows:

$$h(t,\tau) = \int \int \int \exp\{j2\pi\lambda_0^{-1}(\Omega_1 \cdot r_{1,m})\}\exp\{j2\pi\lambda_0^{-1}(\Omega_2 \cdot r_{2,n})\} \cdot$$
$$\exp\{j2\pi v\} h(\Omega_1, \Omega_2, v, \tau) d\Omega_1 d\Omega_2 dv.$$

$$= \int \int \int [c_1(\Omega_1)]_m [c_2(\Omega_2)]_n \exp\{j2\pi v\} h(\Omega_1, \Omega_2, v, \tau)$$
$$d\Omega_1 d\Omega_2 dv.$$

It can be inferred from this that $h(t;\tau)$ can be expressed in the form $$h(t;\tau) = \int\int\int c_2(\Omega_2) c_1(\Omega_1)^T \exp\{j2\pi v\} h(\Omega_1, \Omega_2, v, \tau)$$
$$d\Omega_1 d\Omega_2 dv \tag{15}$$

Now, by inserting the right-hand side of this formula into Formula (13) and by arranging the terms, a relation is achieved for the radio channel varying with respect to time and frequency, the relation being $$y(t) = \int\int\int c_2(\Omega_2) c_1(\Omega_1)^T x(t-\tau) \exp\{j2\pi v\} h(\Omega_1, \Omega_2, v, \tau)$$
$$d\Omega_1 d\Omega_2 dv d\tau. \tag{16}$$

In the discrete case, equations (15) and (16) are reduced to be of the form $$h(t;\tau) = \sum_{k=1}^{K} \alpha_k \exp\{j2\pi v_k t\} c_{2,k} c_{1,k}^T \delta(\tau - \tau_k) \tag{17}$$

$$y(t) = \sum_{k=1}^{K} \alpha_k \exp\{j2\pi v_k t\} c_{2,k} c_{1,k}^T x(\tau - \tau_k). \tag{18}$$

FIG. 5A illustrates examples of an arrangement for implementing the simulation in accordance with a preferred embodiment the invention. The arrangement comprises a simulator 500, in which the necessary calculation operations for implementing the simulation can be implemented as solutions based either on hardware or software. In the example of the figure, M signals 502 $x_1(t), \ldots, x_M(t)$ are supplied to the simulator as input, the signals thus corresponding with a signal component to be supplied to M transmitting antennas. Correspondingly, N signals 504 $y_1(t), \ldots, y_N(t)$ are obtained as output, the signals thus corresponding with the signal component to be obtained from N receiving antennas. The control of the simulator, such as feeding of simulating parameters and the user interface, is carried out from a control unit 506.

FIG. 5B illustrates another example otherwise similar to the previous one except that the input signal 502 is one signal x(t) which, when necessary, is divided to two or more branches inside the simulator. In such a case, each transmitting antenna thus transmits the same signal component.

FIG. 5C illustrates still another example wherein the output signal 504 has been combined into one signal y(t). In all the examples above, the input and output signals 502, 504 of the simulating apparatus 500 may be either radio frequency or baseband frequency ones, either analog or digital. Furthermore, no separate control unit 506 is necessarily needed but the control unit may be integrated into the simulating apparatus. The simulating apparatus may also comprise both an integrated and an external control unit which can be e.g. a computer connected to the simulating apparatus by a suitable bus interface.

FIG. 5D illustrates further different input/output alternatives. The input comprises an analog radio frequency signal 508, which is converted in a converter 510 into a baseband analog signal. This signal is supplied to an A/D converter 512, in which it is converted into a digital form, i.e. a digital baseband signal is obtained. This is supplied to the simulating unit 500, whose output further comprises a digital baseband output signal. This is forwarded to a D/A converter 514 whose output comprises an analog baseband signal. In a converter 516, this is converted into a radio frequency analog signal. Implementing the inputs and outputs in different stages of the above-described arrangement enables simulating solutions of different types to be implemented in a versatile manner by using a single simulating apparatus.

Figure 6:
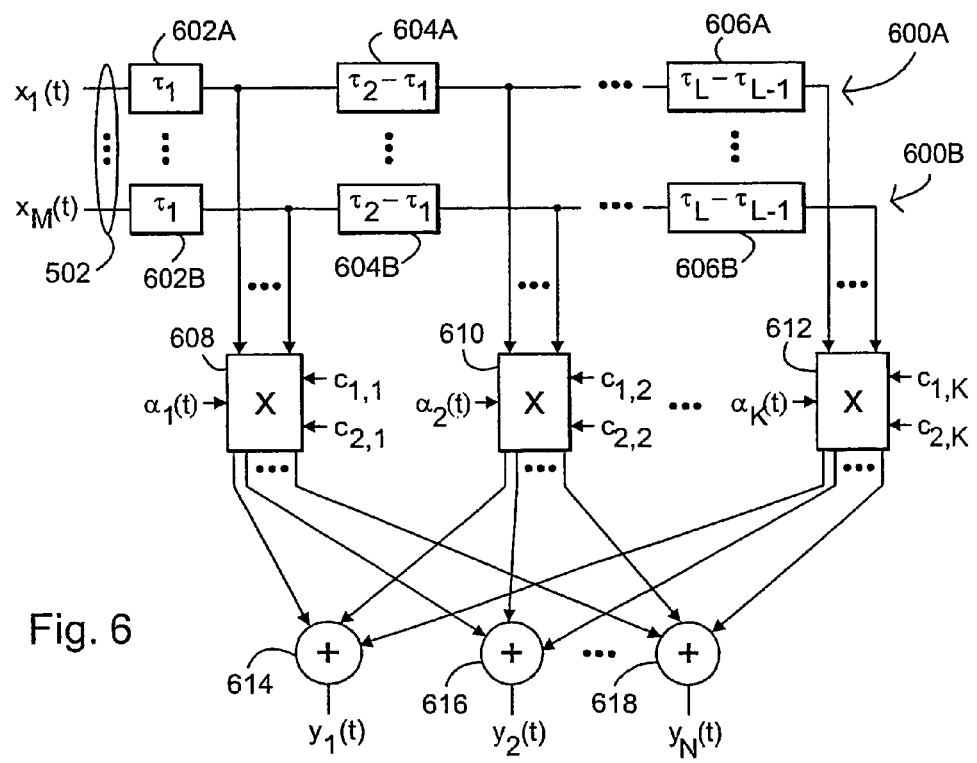
FIG. 6 illustrates an example of a preferred embodiment.

FIG. 6 illustrates an implementation example of a simulator in accordance with a preferred embodiment of the invention for a discrete model of a MIMO radio channel. This implementation is in accordance with Formula (18).

M signals $x_1(t), \ldots, x_M(t)$, which thus correspond with the signal component to be supplied to M transmitting antennas, constitute the input 502. These signals are supplied to M similar delay lines 600A, 600B, each comprising a delay element 602A to 606A, 602B to 604B connected in series for each propagation path. The delay elements 602A, 602B, wherein delay $\tau_1$ is caused to the signal, i.e. the outputs of the delay elements comprise signals $x_1(t-\tau_1), \ldots, x_M(t-\tau_1)$, thus correspond with the first propagation path. The delay elements 604A, 604B, wherein delay $\tau_2 - \tau_1$ is caused to the signal, correspond with the second propagation path. The outputs of the delay elements thus comprise signals $x_1(t-\tau_2), \ldots, x_M(t-\tau_2)$. Correspondingly, the delay elements 606A, 606B, wherein delay $\tau_K - \tau_{K-1}$ is caused to the signal, correspond with the $K^{th}$ propagation path. The outputs of the delay elements thus comprise signals $x_1(t-\tau_K), \ldots, x_M(t-\tau_K)$.

The output signals of the delay elements corresponding with each propagation path are supplied to weighting means, in which the signal is multiplied by term $\alpha_k$ describing the distortion of a propagation path, by term $c_{1,k}$ in dependence of a control vector of each transmitting antenna and by term $c_{2,k}$ in dependence of a control vector of each receiving antenna.

The output signals $x_1(t-\tau_1), \ldots, x_M(t-\tau_1)$ of the delay elements 602A, 602B corresponding with the first propagation path are thus supplied to a weighting means 608, which also receives as input term $\alpha_1$ describing the distortion of the propagation path, as well as antenna control vectors $c_{1,1}$ and $c_{2,1}$. These are multiplied with each other. The output signals $x_1(t-\tau_2) \ldots, x_M(t-\tau_2)$ of the delay elements 604A, 604B corresponding with the second propagation path are supplied to a weighting means 610, which also receives as input term $\alpha_2$ describing the distortion of the second propagation path, as well as antenna control vectors $c_{1,2}$ and $c_{2,2}$. Correspondingly, the output signals $x_1(t-\tau_K), \ldots, x_M(t-\tau_K)$ of the delay elements 606A, 606B corresponding with the $K^{th}$ propagation path are supplied to a weighting means 612, which also receives as input term $\alpha_K$ describing the distortion of the $K^{th}$ propagation path, as well as antenna control vectors $c_{1,K}$ ja $c_{2,K}$.

A preferred embodiment of the weighting means 608 to 612 has been described above in connection with FIGS. 3A and 3B.

The output of each weighting means 608 to 612 comprises a signal for each receiving antenna. These terms corresponding with each receiving antenna and obtained from the outputs of the weighting means are added up in adders 614 to 618. The terms corresponding with the first receiving antenna are thus added in the adder 614, which yields term $y_1(t)$ and, correspondingly, the terms corresponding with the $N^{th}$ receiving antenna are added up in the adder 618, which yields term $y_N(t)$. This results in N signals 504 $y_1(t), \ldots, y_N(t)$, which thus correspond with the signal component to be obtained from the $N^{th}$ receiving antenna.

Inputs of the weighting means other than signal terms $x_m(t)$, i.e. terms $\alpha_k$ describing the distortion of the propagation path, and terms $c_{1,k}$ and $c_{2,k}$ in dependence of the control vector of each transmitting and receiving antenna, are obtained either directly from the control means 506 of the simulator (FIGS. 5A to 5C), or the control means provide parameters for the calculation thereof.

Although the invention has been described above with reference to the example in accordance with the accompanying drawings, it is obvious that the invention is not restricted thereto but can be modified in many ways within the inventive idea disclosed in the attached claims.

What is claimed is:

1. A method for simulating a radio channel, wherein a signal transmitted by more than one antenna and received by one or more antennas as well as propagated via one or more propagation paths is simulated, the method comprising:

supplying an input signal of each transmitting antenna to a similar delay line, each delay line comprising a delay element connected in series for each propagation path;

weighting, in weighting means, an output signal of the delay elements corresponding with each propagation path by a term in dependence of a control vector of each transmitting antenna, by a term describing the distortion of a propagation path, and by a term in dependence of a control vector of each receiving antenna, a signal component thus being provided for each receiving antenna; and adding up the components corresponding with each receiving antenna and obtained from the outputs of the weighting means.

2. A method as claimed in claim 1, further comprising: adding up the input signals of the antennas weighted by the control vector of the transmitting antenna prior to weighting by the term describing the distortion of the propagation path.

3. A method as claimed in claim 1, further comprising: dividing the signal weighted by the term describing the distortion of the propagation path to a branch corresponding with the number of receiving antennas.

4. A method as claimed in claim 1, further comprising: selecting the distance between the transmitting antennas such that the output angles of the signals transmitted from the antennas are equal in size.

5. A method as claimed in claim 1, further comprising: multiplying the output signal of the delay elements corresponding with each propagation path in a multiplier by the term in dependence of the control vector of each transmitting antenna, by the term describing the distortion of a propagation path and by the term in dependence of the control vector of each receiving antenna.

6. A device for simulating a radio channel, wherein a signal transmitted by more than one antenna and received by one or more antennas as well as propagated via one or more propagation paths is simulated, the device comprising:

M similar delay lines, each delay line comprising a delay element connected in series for each propagation path, the input of the delay lines comprising M signals to be transmitted;

a number of weighting means whose input comprises output signals of the delay elements corresponding with each propagation path, the output signals being weighted by a term describing the distortion of a corresponding propagation path, by a term in dependence of a control vector of each transmitting antenna and by a term in dependence of a control vector of each receiving antenna, the terms being located in other inputs, and whose output comprises a signal for each receiving antenna; and an adder configured to add up the terms corresponding with each receiving antenna and obtained from the outputs of the weighting means.

7. A device as claimed in claim 6, wherein the weighting means are implemented by a multiplier.

8. A device as claimed in claim 6, wherein the weighting means are configured to add up the input signals of the antennas weighted by the control vector of the transmitting antenna prior to weighting by the term describing the distortion of the propagation path.

9. A device as claimed in claim 6, wherein the weighting means are configured to divide the signal weighted by the term describing the distortion of the propagation path to a branch corresponding with the number of receiving antennas.

10. A device as claimed in claim 9, wherein the weighting means are configured to weigh each branch by the term in dependence of the control vector of a corresponding receiving antenna.

* * * * *